United States Patent [19]
Smith et al.

[11] Patent Number: 5,722,610
[45] Date of Patent: Mar. 3, 1998

[54] BELT-DRIVEN DATA CARTRIDGE WITH REDUCED TAPE PACK DEFORMATION

[75] Inventors: David P. Smith, Hudson, Wis.; Koichi Sano, Sagamihara, Japan

[73] Assignee: Imation Corp., Oakdale, Minn.

[21] Appl. No.: 744,627

[22] Filed: Nov. 6, 1996

[51] Int. Cl.⁶ .................. G11B 23/087; G11B 15/32
[52] U.S. Cl. .......................... 242/342; 242/352.4
[58] Field of Search ........................ 242/340, 342, 242/352.4; 360/132

[56] References Cited

U.S. PATENT DOCUMENTS

| | | | |
|---|---|---|---|
| 3,692,255 | 9/1972 | von Behren | 242/342 |
| 4,162,774 | 7/1979 | Bowers | 242/342 |
| 5,199,660 | 4/1993 | Smith | 242/342 |
| 5,358,193 | 10/1994 | Madsen et al. | 242/342 |

FOREIGN PATENT DOCUMENTS

| | | |
|---|---|---|
| 0579116 | 1/1994 | European Pat. Off. |
| 48-15517 | 2/1973 | Japan |
| 2117353 | 10/1983 | United Kingdom |
| WO 93/24928 | 12/1993 | WIPO |
| WO 96/01471 | 1/1996 | WIPO |

OTHER PUBLICATIONS von Behren & Smith, "Mechanical Design of a Belt–Driven Data Cartridge," *Adv. Info. Storage Systems*, vol. 1, 49, 1991.

Smith & von Behren, "Squeeze–Film Analysis of Tape Winding Effects in Data Cartridge," Reprinted from: *Tribology and Mechanics of Magnetic Storage Systems*, vol. VI, (Oct. 1989).

*Primary Examiner*—John Q. Nguyen
*Attorney, Agent, or Firm*—Eric D. Levinson

[57] ABSTRACT

A belt-driven tape cartridge with reduced tape pack deformation and more spatially homogeneous tape tension. The belt driven tape cartridge has a supply side tape hub and a winding side tape hub both rotatably mounted on the base. The tape is wound around the hubs to form a tape pack about each hub. A drive roller is rotatably mounted on the base. First and second rollers are rotatably mounted on the base. The drive belt is engaged on the drive roller, the tape pack on the supply side tape hub, the first and second corner rollers, and the tape pack on the winding side tape hub. The pack belt is engaged between the first and second corner rollers and disposed on the inner side of the drive belt. The drive belt has a width less than a width of the pack belt such that tape pack deformation is reduced and the tape tension is more spatially homogeneous.

18 Claims, 9 Drawing Sheets

BELT-DRIVEN DATA CARTRIDGE WITH REDUCED TAPE PACK DEFORMATION

FIELD OF THE INVENTION

The present invention relates to tape cartridges having two hubs with tape wound around each of the hubs and extending from one hub to the next, and more particularly to a belt-driven tape cartridge with reduced tape pack deformation and more spatially homogeneous tape tension.

BACKGROUND OF THE INVENTION

The belt-driven tape cartridge, or data cartridge, has been known for many years, e.g., as shown in U.S. Pat. No. 3,692,255 (von Behren) and Japanese Laid-Open Patent Publication No. 48-15517. As shown in FIGS. 1–3 of the von Behren reference, the typical data cartridge includes a housing enclosing a pair of rotatably mounted tape hubs about which tape is wound. In the course of passing from one hub to the other, the tape passes along a predefined tape path in the data cartridge, which takes it past a cut-away portion through which the head of a drive can access the tape. The data cartridge housing also encloses a pair of corner rollers, and a drive roller. An elastic belt is stretched around the rollers and the tape packs on the hubs. The drive roller is accessible by a drive puck of a tape drive through an opening formed at the front of the housing. Movement of the drive roller by the puck causes the belt to move, and frictional engagement between the belt and the tape then causes the tape to move. In addition to moving the tape, the belt provides proper tension in the tape. The tape can be moved and read in either direction, i.e., either hub can serve as the supply hub and either as the take-up hub. The terms "supply hub" and "take-up hub" will be used in describing the operation of the invention herein, but it is to be understood that either hub could play the role of a supply hub or a take-up hub, depending on the direction of movement of the tape at any given moment.

The edges of the drive belt and pack belt represent discontinuities that exhibit increased pressure regions on the tape pack. As the thickness of the tape is reduced, belt driven tape cartridges experience increasing levels of tape pack deformation proximate the edges of the belts which can possibly cause read/write errors due to unstable head-to-tape contact, especially in high recording density applications.

Drive belts and pack belts are typically constructed by stamping flat sheet-stock to form structures having a shape corresponding to the cross-section of a hollow cylinder. The stamped structures are then stretched to form belts. The inside edge of the stamped structure tends to generated more belt tension than the outside edge. Consequently, the edge of the belt corresponding to the inside edge of the belt structure tends to cause more tape pack deformation than the outside edge.

Proper tension must be maintained in the tape for it to maintain proper contact with the head. As explained in the von Behren reference, this tape tension is created due to the combined effects of differences in speed between the tape hubs, the relative elasticity of the belt and inelasticity of the tape, and friction in various components in the data cartridge. Thus, a number of elements in the cartridge can be modified to adjust the tape tension.

In *Advanced Information Storage Systems*, vol. 1, 49, 1991, Robert A. von Behren and David P. Smith put forth a formula which approximated the various effects on tape tension. The article indicates the tension of the tape on a reading/writing magnetic head is expressed by the following equation:

$$Th = \{(T3-T2) + Ts + Mb \cdot tb(1/D1 - 1/D2)\} \cdot (\text{Multiplier Term})$$

where

- $Th$ = the tensile force of tape on the reading/writing magnetic head
- $T3-T2$ = the rotational frictional forces of the corner rollers
- $Ts$ = the rotational frictional force of the supply hub
- $Mb$ = the elastic modulus of the drive belt
- $tb$ = the thickness of drive belt
- $D1$ = the outer diameter of the tape pack on the supply hub
- $D2$ = the outer diameter of the tape pack on the take-up hub
- Multiplier Term = a term relating to the frictional force between the tape and tape guide.

As tape is wound from the supply hub to the take-up hub, the diameters $D1$ and $D2$ gradually change. As shown by the third term of the above equation, this means that the tape tension also changes. In particular, this creates a gradient in the tape tension as the tape is wound from one end of the tape to the other. More specifically, the tape is moved by the drive belt, which in turn is driven by an external motor via the drive roller. As the tape winds onto the take-up hub, the drive belt must stretch to accommodate the extra diameter. At the same time, the supply hub shrinks, allowing the drive belt to contract around it. The result is that the speed of the supply hub varies compared to that of the take-up hub. Since the tape is relatively inelastic compared to the belt, the difference between the speeds of the hubs is converted into tensile force in the tape and, consequently, the difference between the driven speeds of both tape packs increases as the difference in the pack diameter of the tape wound into tape packs around both hubs increases, thus generating a gradient in the tensile force of the tape.

In practice, the difference between the minimum and maximum tensile force on the tape typically is approximately 0.49N. The tensile force differential causes several problems. First, the contact pressure between the magnetic head and the tape varies with the tape tension, so that stable contact pressure cannot be maintained. The edge of the tape must withstand a broad range of tape tension variation, that makes it more difficult to obtain high durability in the tape. It is difficult to reduce errors in recording or reproducing information due to all of the foregoing variations. Additionally, the motor in the drive must be capable of driving the tape accurately at both the highest and the lowest drive force levels. The broader the range, the greater the difficulty this poses.

Designing a suitable system to use a data cartridge is complex. As will be apparent from the foregoing, it is necessary to be sure the maximum force needed to move the tape is smaller than the maximum drive force which a drive motor can provide. It is important that the drive provides enough force to the cartridge to maintain the minimum tape tension necessary for the magnetic head to make good contact with the tape. It is also necessary to control frictional forces between various parts in the data cartridge. For example, it is necessary to minimize the frictional forces in the contact portions between the tape and tape guides, between the drive roller and its shaft, and between the tape hubs and their shafts. On the other hand, it is necessary for the corner rollers to maintain a certain level of friction to generate an appropriate drag force. Thus, it is not desirable to reduce the frictional force in the corner rollers as far as possible. PCT Application No. WO 96/01471 discloses a restraining mechanism to engage the outer surface of the tape pack on the take-up hub, with more force being applied as more tape accumulates on the take-up hub. Pressure from the restraining mechanism applies a load to the take-up hub, which restrains rotation of that hub. The load on the hub reduces the difference between the rotational speeds of the supply and take-up hubs. The restraining mechanism functions to reduce the variation of the tension of the tape which occurs due to change in thickness of the tape pack wound around the tape hubs as the tape travels from its beginning to its end, and vice versa. The restraining mechanism comprises a pack belt engaged between the first and second corner rollers, inside the drive belt. The pack belt is positioned onto the corner rollers and the drive belt is positioned around the pack belt in a co-planar fashion.

The combination of thinner tape and greater tape lengths results in greater sensitivity to increases in minimum tape tension, maximum tape tension and maximum drive force, as well as spatially non-homogeneous tape tension along the length and across the width of the tape.

BRIEF SUMMARY OF THE INVENTION

The present invention solves these and other problems by providing a drive belt having a width less than the width of the pack belt. The pack belt is engaged between the first and second corner rollers, inside the drive belt. The pack belt is positioned onto the corner rollers and the drive belt is positioned around the pack belt in a co-planar fashion. The load on the tape pack from the combination drive belt and pack belt is distributed along four belt edges, rather than two common edges, resulting in lower tape pack deformation.

Pressure from the pack belt applies a load to the take-up hub, which restrains rotation of that hub, with a corresponding reduction in the difference between the rotational speeds of the supply and take-up hubs. The pack belt functions to reduce the variation of the tension of the tape which occurs due to change in thickness of the tape pack wound around the tape hubs as the tape travels from its beginning to its end, and vice versa. Consequently, the tape exhibits a more homogeneous tape tension throughout the full length and width of the tape.

In the belt driven tape cartridge, a supply side tape hub and a winding side tape hub both are rotatably mounted on the base. The tape is wound around the hubs to form a tape pack about each hub. A drive roller is rotatably mounted on the base. First and second rollers are rotatably mounted on the base. A drive belt is engaged on the drive roller, the tape pack on the supply side tape hub, the first and second corner rollers, and the tape pack on the winding side tape hub. A pack belt is engaged between the first and second corner rollers and disposed on the inner side of the drive belt. The drive belt has a width less than a width of the pack belt. The width of the drive belt is preferably about one half the width of the pack belt. The tension pre-applied to the pack belt is between about 0.55 to 5.56N. The tension pre-applied to the drive belt is between about 1.11 and 5.56N. The pack belt and the drive belt are preferably constructed from an elastic material.

Preferably, the pack belt starts to press the tape pack on the take-up hub after approximately half of the tape wound around the supply hub has shifted to the take-up hub. Combining the pack belt with a self-acting hydrodynamically lubricated guide can significantly lower total drive force required to move and tension the tape.

A dramatic reduction in the drive force required to operate a cartridge, while simultaneously providing proper movement control and tape tension for the tape, has significant advantages. Most notably, the power requirements for the drive operating the cartridge can be substantially reduced. In addition, heat dissipation in the cartridge will be substantially reduced, which reduces problems due to degradation of the materials due to heat and may result in extending the lifetime of the cartridge. A further use of the tension control characteristics of the pack belt is to allow for smaller hubs. The current diameter of a hub in the tape pack is relatively large, because a smaller diameter hub would only exacerbate the bow tie. Bow tie refers to variation in tape tension and drive force as the tape is would from the beginning of the tape (BOT) to the end of the tape (EOT), and back again, as discussed in U.S. patent application Ser. No. 08/496,365 (Sano et al.), Pat. No. 5,577,681, entitled Belt-Driven Data Cartridge with Pack Belt. However, the significantly improved tape tension control provided by a pack belt would allow substantial reductions in the diameter of the tape hub. This in turn would allow a substantial increase in the amount of tape which could be held in a given cartridge, dramatically increasing the capacity of the cartridge. More accurate control also allows for increased data density on the tape. Higher data density means a cartridge can hold more data or hold the same data with less tape.

The relationship between an outer diameter (r) of the supply side tape hub with no tape wound there around and a maximum outer diameter (R) with the tape wound around and layered on the supply side tape hub is $R/r \geq 2.6$.

The present invention is also directed to a belt-driven cartridge having a drive belt with a width less than the width of the pack belt. In quarter inch mini cartridges, the tension in the pack belt is pre-applied to be about 30–110% of the tension in the drive belt, more preferably 40–80% of the tension in the drive belt and most preferably 55–65%. In an 8 mm data cartridge, the tension in the pack belt is pre-applied to be about 25–35% and more preferably at about 30%.

One side each of the pack belt and the drive belt may optionally be coated with an electrically conductive coating. The coated side of the pack belt faces the corner rollers and the coated side of the drive belt faces the uncoated side of the pack belt. The materials of the pack belt and the coating on the drive belt are selected such that the coefficient of friction between them is about 0.1 to 0.4. The tape may optionally be guided along at least a portion of a tape path by self-acting hydrodynamically lubricated guides.

DETAILED DESCRIPTION OF THE INVENTION

Figure 1:
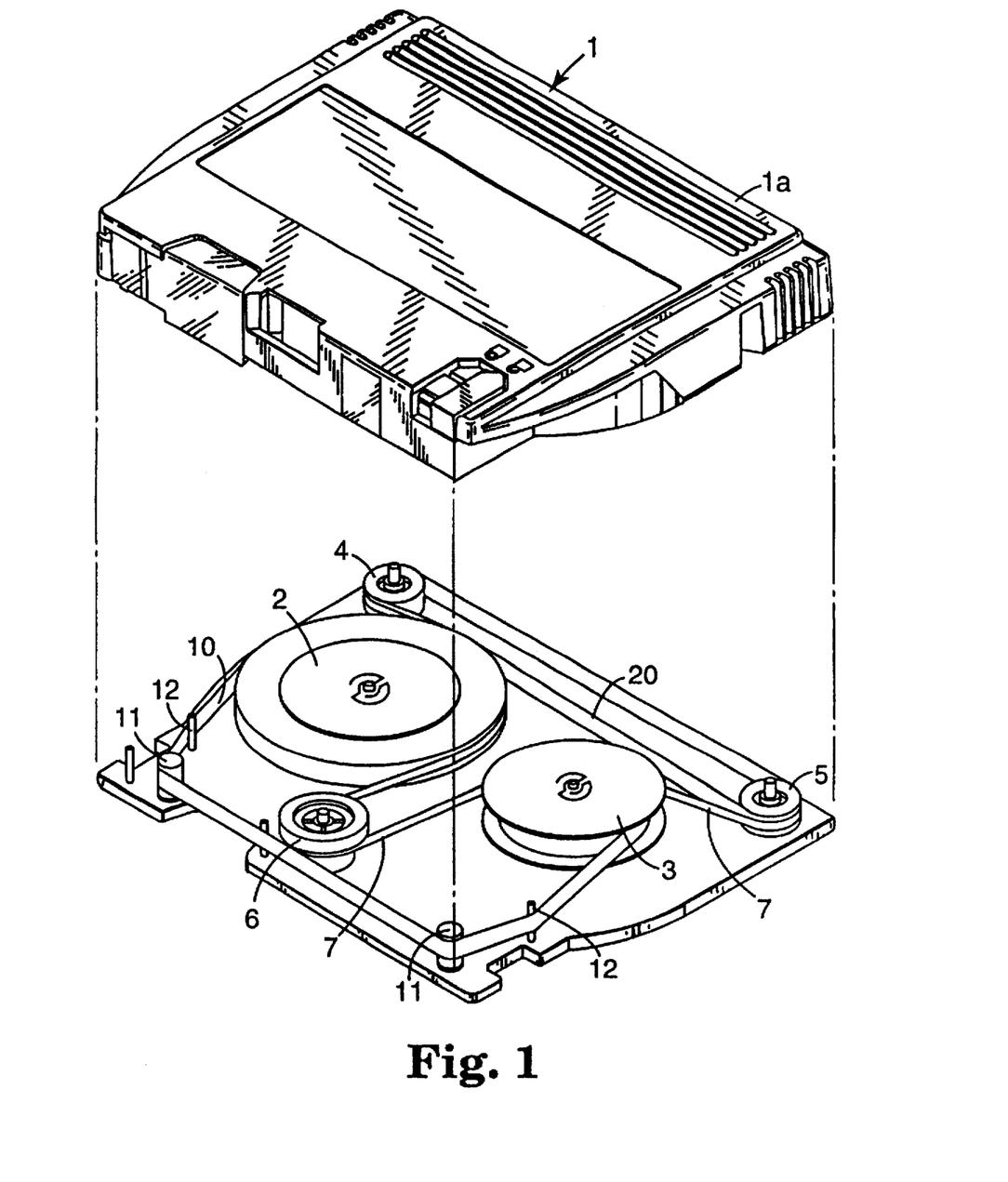
FIG. 1 is a partially exploded perspective view showing construction of a belt-driven tape cartridge.
Figure 2:
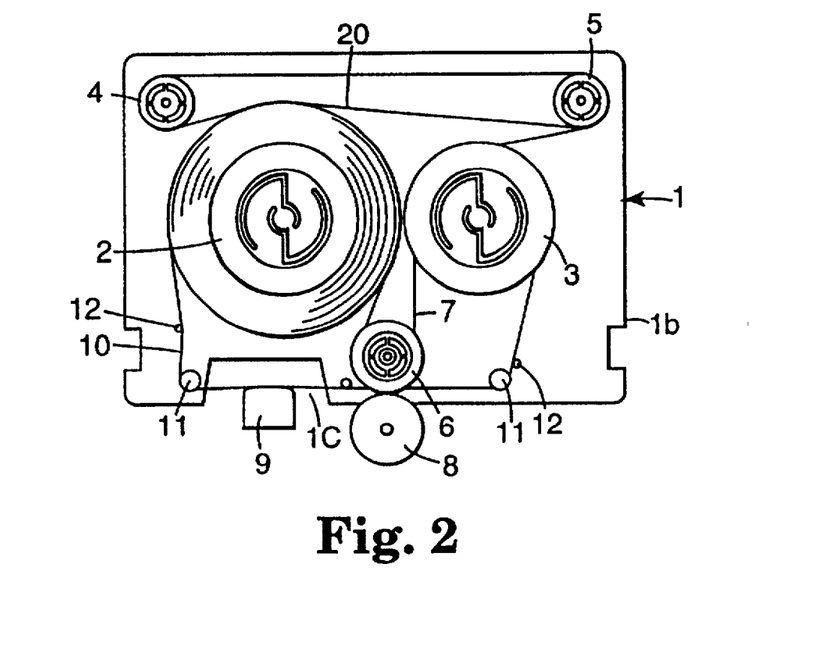
FIG. 2 is a plan view of an alternate belt-driven tape cartridge.

FIGS. 1 and 2 illustrate two embodiments of data cartridges according to the present invention. Common components are labeled with corresponding reference numerals. In these data cartridges, a housing 1 is formed of a shell 1a and baseplate 1b. Tape hubs 2, 3, corner rollers 4, 5 and a drive roller 6 rotatably mounted therein are contained in the housing 1. Tape 10 is wrapped around the hubs 2, 3 and is fed via a predetermined tape path past a media access opening 1c (see FIG. 2). This tape path is usually established in part by tape guides 11, and in some cartridges, wrap pins 12 (wrap pins generally are used in larger cartridges, but not smaller ones). An elastic pack belt 20 is stretched around the two corner rollers 4, 5. A drive belt 7 is mounted around the drive roller 6, the tape packs formed on the hubs 2, 3 and around the corner rollers 4, 5. The corner rollers 4, 5 also preferably include a crown to help center the drive and pack belts 7, 20. When a sufficient amount of tape 10 is wound around one of the hubs 2, 3, the tape pack engages the pack belt 20. This engagement provides additional load on that tape pack to reduce the difference in speeds between the hubs 2, 3. A belt-driven data cartridge with pack belts is disclosed in U.S. patent application Ser. No. 08/496,365 (Sano et al.) entitled Belt-Driven Data Cartridge with Pack Belt.

Figure 6:
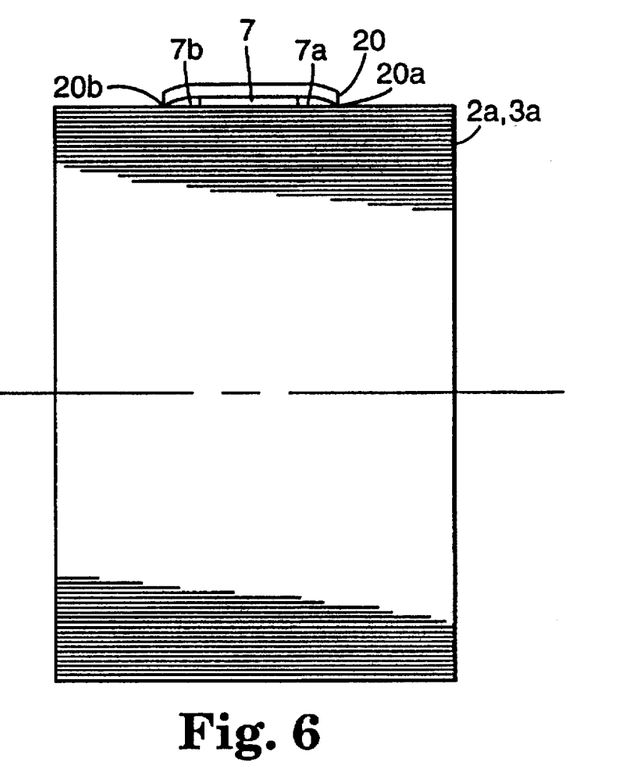
FIG. 6 is a schematic illustration of the engagement of the drive and pack belts with the tape pack.

As best seen in FIG. 6, the drive belt 7 is narrower than the pack belt 20. The drive belt 7 is about 1.7 mm wide and the pack belt 20 is about 3.5 mm wide. Generally, the pack belt 20 is twice as wide as the drive belt 7. The edges 7a, 7b of the drive belt 7 are discontinuities in the drive belt material that result in higher belt pressures on the tape packs 2a, 3a at the locations 7a, 7b. Similarly, the edges 20a, 20b of the pack belt 20 are discontinuities in the pack belt material that result in higher belt pressures on the tape packs 2a, 3a results at the locations 20a, 20b. Consequently, a substantial portion of the total load transmitted by the combination drive belt/pack belt 7, 20 is distributed over four locations 7a, 7b, 20a, 20b.

The material of the pack belt 20 can be the same as that of the drive belt 7, and of the conventional materials generally used. By appropriate adjustment of the relative tensions between the pack belt and the drive belt, the size of the bow tie can be adjusted through a wide range. Although the tension of the belts differs depending on the desired effect and the size of the cartridge in which they are being used, the drive belt generally should be in a range between 1.11 to 5.56N and the pack belt generally should be in a range between 0.55 to 5.56N.

Use of the pack belt 20 reduces the variation in the tensile force of the tape between the beginning and the end to less than one-half of that in the conventional data cartridge. This construction will allow future data cartridges to have much higher recording densities due to stable head contact along the entire length of the tape, as well as favorable travel performance of the tape, high durability, and low error rate.

The present drive belt configuration may be used on a variety of data cartridges, such as the models DC2120 and DC 6150, the Magnus™ (13 GB) cartridge and Travan™ data cartridges, all manufactured by Minnesota Mining and Manufacturing Company (3M). The configuration of the Travan cartridge is shown in FIG. 1.

Preferably, the tensile force applied to the pack belt 20 to obtain the desired effects is about 0.55 to 5.01N. If the tensile force applied to the pack belt 20 is less than about 0.55N, the pack belt 20 may be incapable of pressing against the take-up hub strongly enough to apply a sufficient load to reduce the rotation of the take-up hub significantly. This would leave the cartridge functioning very similarly to a cartridge without a pack belt 20, i.e., the tensile force of the tape would vary significantly. On the other hand, if the tensile force applied to the pack belt 20 is more than about 5.01N, the loads applied to the corner rollers 4, 5 and the tape hubs 2, 3 become large, increasing the drive force required from the drive to move the tape 10.

More preferably, the tensile force applied to the pack belt 20 is set to be about 0.83 to 4.17 (3–15 oz), but generally less than the tensile force to be applied to the drive belt 7 (which varies depending on the size of the cartridge). For example, in a typical minicartridge manufactured by 3M (e.g., DC 2120), the tensile force applied to the drive belt 7 is about 7–13 ounces (about 1.95–3.62 N). In a large cartridge manufactured by 3M (e.g., DC 6150), the tensile force applied to the drive belt 7 is about 12–18 ounces (about 3.34–5.01N).

Preferably, the pack belt 20 is made of a flexible elastic material, similar or identical to the material of the drive belt 7. The flexible elastic material preferably contains polyurethane elastomer and trace quantities of carbon black. A polyurethane elastomer, preferably, Estane series (item numbers "58271", "58277", "58881", and "58810") manufactured by Goodrich Corp. is used. Preferably, the width of the pack belt 20 is in a range of 4 to 8 mm before it is stretched, in a range of from 2 to 5 mm after it is engaged between the corner rollers 4, 5 and less than the width of the tape 10. Preferably, the thickness of the pack belt 20 is in a range of 100 to 220 μm. The tension pre-applied to both the drive belt 7 and the pack belt 20 can be adjusted by adjusting their materials or sizes, but is most easily adjusted by changing the mount by which they are pre-stretched before installation in the data cartridge—the longer the distance they are pre-stretched, the lower the tension after installation. A method of pre-stretching the belt using thermal treatments has been described in EP 0 579 116 (Schoeppel et at.).

As described above, in the conventional tape cartridge, enough tensile force must be applied to the drive belt 7 by the rotational frictional force of the corner rollers 4, 5 to tension and move the tape 10. However, because the pressure on the corner rollers 4, 5 of the conventional tape cartridge varies with the belt tension, merely designing for a smooth rotation of the rollers is insufficient.

In contrast, in the tape cartridge according to the present invention, a constant pressure, and therefore a constant frictional force, is generated on the corner rollers 4, 5 by the pack belt 20 engaged between the corner rollers 4, 5 and the variation in pressure from the drive belt can be minimized. Therefore, the corner rollers 4, 5 can be optimized to simply rotate smoothly. Hence, a lubricant can be applied to the supporting shaft of the corner rollers 4, 5, to reduce the frictional force between the corner rollers 4, 5 and the supporting shafts thereof and prevent the corner rollers 4, 5 from abrading or seizing. Grease is preferable as the lubricant. In controlling the tension of the tape 10 so that it does not contact the magnetic head 9 at excessively low pressure, a minimum necessary rotational frictional force or drag must be imparted to the corner rollers 4, 5. Liquid lubricant keeps the rotational frictional force of the corner rollers 4, 5 excessively low. Grease also can reliably stay between the corner rollers 4, 5 and their supporting shafts rather than flowing out. Suitable lubricants are disclosed in U.S. patent application Ser. No. 08/496,365 (Sano et al.).

In the tape cartridge according to this embodiment, lubricant also preferably is applied between the drive roller 6 and its supporting shaft. A grease similar to that described above for the corner rollers 4, 5, but with a lower viscosity, can be used.

It also has been found that proper use of electrically conductive coatings on the drive belt 7 and pack belt 20 can significantly affect bow-tie. PCT Patent Publication No. WO 93/24928 describes certain coatings which may advantageously be applied to a drive belt. The coating includes carbon black and aluminum oxide particles dispersed in a polymeric binder. The coating is electrically conductive, minimizes wear on the roller, minimize voltage buildup and electrical discharge within the cartridge. Normally, these coatings are on the side of the belt which contacts the corner rollers, and not on the side which contacts the tape packs.

Figure 3:
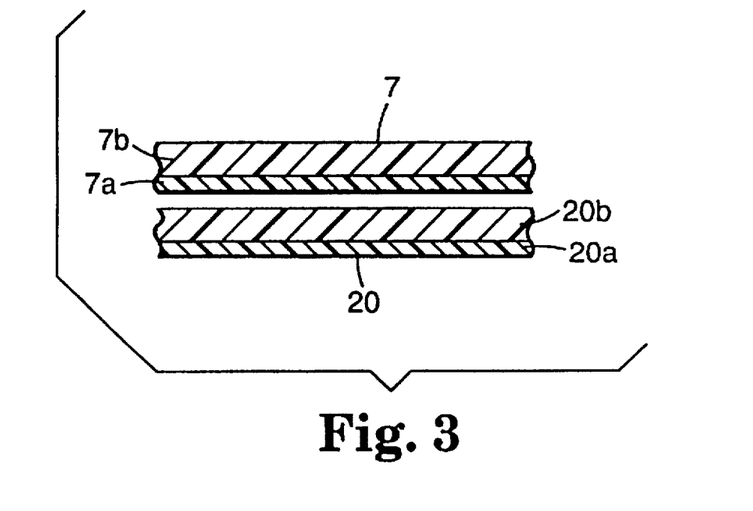
FIG. 3 is a schematic view of the preferred coating alignment on the belts in the first embodiment.

Pack belt 20 can be coated in a similar manner to the drive belt 7. If so, it has been found that the best combination is to have the coated side of the drive belt contact the uncoated side of the pack belt, rather than having both coated sides of the belts contact each other. As shown in FIG. 3, coated side 20a of the pack belt 20 contacts the corner rollers 4, 5, the coated side 7a of the drive belt 7 contacts the uncoated side 20b of the pack belt 20, and the uncoated side of the drive belt 7b contacts the tape packs. Such a construction dramatically reduces the bow-tie compared to having the pack belt oriented the other way around.

The amount of restraint provided by the pack belt depends on the frictional engagement with the pack belt. Preferably, in selecting the belt materials and the coating, materials should be selected such that the friction coefficient between the coated side of the drive belt and the uncoated side of the pack belt is about 0.1 to 0.4, more preferably about 0.1 to 0.3, and most preferably about 0.15 to 0.25.

The ability to minimize bow-tie can be used to increase the amount of tape inside a cartridge by allowing for a reduction in the size of the hubs 2, 3. As described above, in the conventional tape cartridge, tensile force generated on the tape 10 varies due to changes in the diameters of the tape packs wound around the hubs. This means that the total size of the bow-tie is controlled in part by the relationship between size of the outer diameter (r) of the tape hub with no tape wound on it and the maximum diameter (R) of the tape hub with the tape wound on it. Given past bow-tie problems, the minimum diameter r has been kept fairly large, to keep the bow-tie from becoming too large. The ability of the present invention to minimize bow-tie allows a modification of the hub diameter r to a much smaller value. This in torn provides more space inside the cartridge for tape, which increases the capacity of the cartridge.

For example, in a quarter inch data cartridge, the relationship between the outer diameters r of the tape hubs and the maximum diameters R of the tape hubs can be set as $R/r \geq 2.6$ and, even more favorably, $R/r \geq 4.0$. More specifically, in a large cartridge, the outer diameters r of the tape hubs could be altered from the 28.3 mm conventionally used to a range of 13 to 17 mm and the maximum diameters R of the tape pack set to a range of 70 to 76 mm ($R/r= 4.12-5.85$). This would allow the cartridge to accommodate 450–500 m of tape, compared to the 310.9 m maximum conventionally used.

Figure 4:
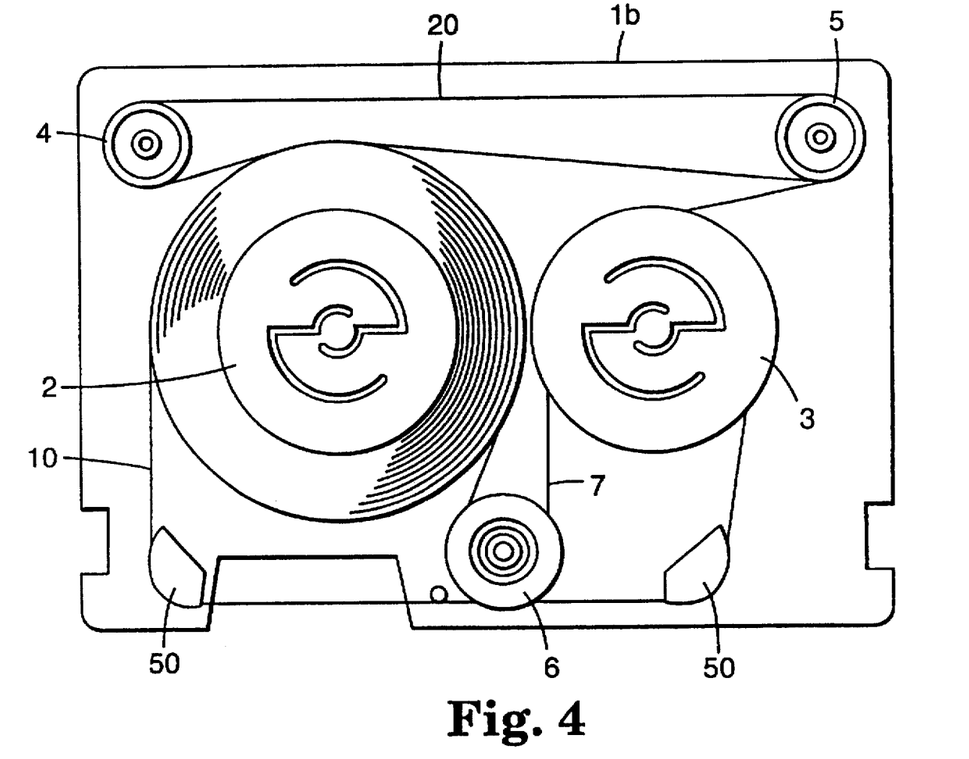
FIG. 4 is a plan view of an alternate construction of a belt-driven tape cartridge.
Figure 5:
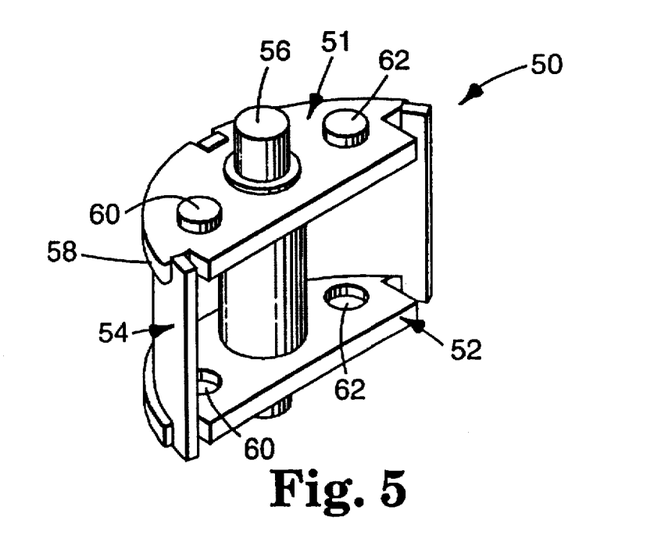
FIG. 5 is a perspective view of a self-acting hydrodynamically lubricated guide of FIG. 4.

According to an alternate embodiment of the invention shown in FIG. 4, most of the components of the cartridge remain the same as in the first embodiment, but self-acting hydrodynamically lubricated guides 50 (SHL guides) of the type taught by U.S. Pat. No. 5,358,193 (Madsen et al.) are substituted for the guides 11 and wrap pins 12. Details of an SHL guide 50 are shown in FIG. 5, in which the guide 50 includes top and bottom flange pieces 51, 52 separated by a tape surface piece 54 and a post 56. Each flange piece 51, 52 is generally semi-circular and can have a constant radius curved side. In the illustrated embodiment, the curved side 58 has a varying radius. The post 56 and two half-shears or buttons 60, 62 then are used to mount the SHL guide 50 in the cartridge housing 1 without rotation. SHL guides 50 are described in great detail in the foregoing patent, and therefore will not be described further herein.

In use, the shape of an SHL guide entraps air between the tape and the tape surface piece 54, thereby providing hydrodynamic lubrication. This effect depends on a combination of tape tension, tape speed, tape guide geometry and surface roughness. When heretofore used in a data cartridge such as that shown in U.S. Pat. No. 5,358,193 (Madsen et al.), the guides have proven to provide good lubrication at high tape travel speeds, but not always at low tape travel speeds, due to the tape tension bow-tie. In contrast, in the current fourth embodiment including a pack belt, good lubrication can be achieved even at lower tape travel speeds, due to reduction of the tape tension bow-tie. The result is that the maximum force necessary to drive the tape can be lowered substantially, while maintaining adequate tension in the tape to ensure proper contact with the magnetic head. Tape movement also is much more controllable at a greater range of tape speeds, allowing for higher density of data storage per unit area of tape.

The invention will be described further by reference to the following specific examples:

EXAMPLES

The cartridge of Example 1 was a modified TR-4 data cartridge manufactured by Minnesota Mining and Manufacturing Company of St. Paul, Minn. constructed with a drive belt having a width of 1.7 mm and a pack belt having a width of 3.5 mm. The drive belt had a tension of 2.53N (9.1 ounces) and the pack belt had a tension of 0.7N (2.5 ounces). The drive belt was prepared by cutting an unstretched coated belt with a scissors to an outer diameter of 2.29 cm (0.9 inches) from 2.54 cm (1.0 inches). The drive belt of Example 1 was installed with the coated side toward the corner rollers and a drive roller. The pack belt was installed with the coated side towards the corner roller and the uncoated polyurethane side toward the drive belt.

Comparative Data Cartridge 1 was constructed from a standard TR-4 data cartridge available from Minnesota Mining and Manufacturing Company. The cartridge was prepared using a pack belt and a drive belt both of which had one side coated with a coating of the type taught by WO 93/24928. According to the teachings of that reference, the coated side of the drive belt faces the corner rollers, while the uncoated side faces the tape pack. The drive belt was set at a tension of 2.8N (10.2 ounces) and the pack belt was set at a tension of 0.75N (2.7 ounces). The total belt tension was 4.1N (14.9 ounces). The pack belt and drive belt both had a width of about 2.8 mm.

Comparative Data Cartridge 2 was a standard TR-4 cartridge available from Minnesota Mining and Manufacturing Company with a drive belt having a width of 2.8 mm and a drive belt tension of 4.82N (17.3 ounces). No pack belt was provided. Comparative Data Cartridge 2 is useful in illustrating tape pack deformation along the two primary edges of the belt system.

EXAMPLE 1

A streaming life test was done on the cartridge of Example 1 and Comparative Data Cartridge 1 at 3.05 cm/sec (120 inches per second) at room temperature to see the stability in tape tensioning and the tape pack deformation. The streaming life test involves advancing to the cartridge from the beginning of the tape (BOT) to the end of the tape (EOT), and back again. Each cycle from the BOT to the EOT, back to the BOT comprises two passes.

Figure 7A:
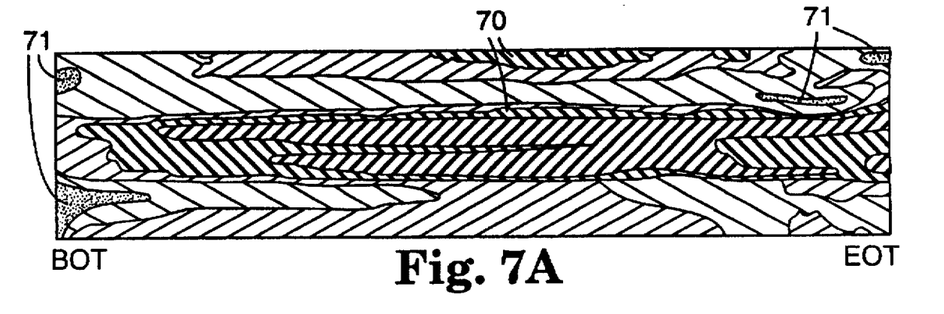
FIGS. 7A and 7B is a graphic illustration of the transverse tape tension in a tape cartridge having a pack belt of the same width as the drive belt.
Figure 7B:
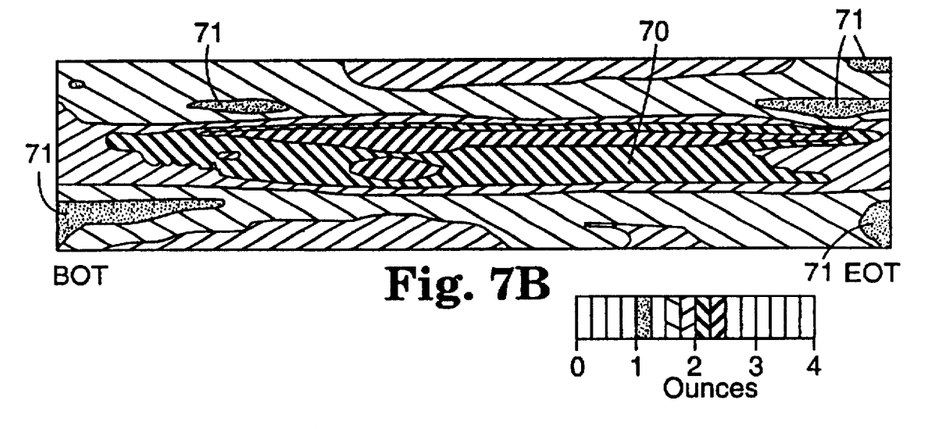
Figure 7C:
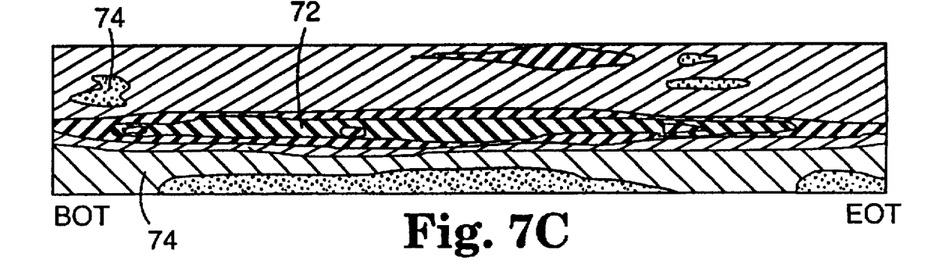
FIGS. 7C and 7D is a graphic illustration of the transverse tape tension in a tape cartridge having a drive belt narrower than the pack belt.
Figure 7D:
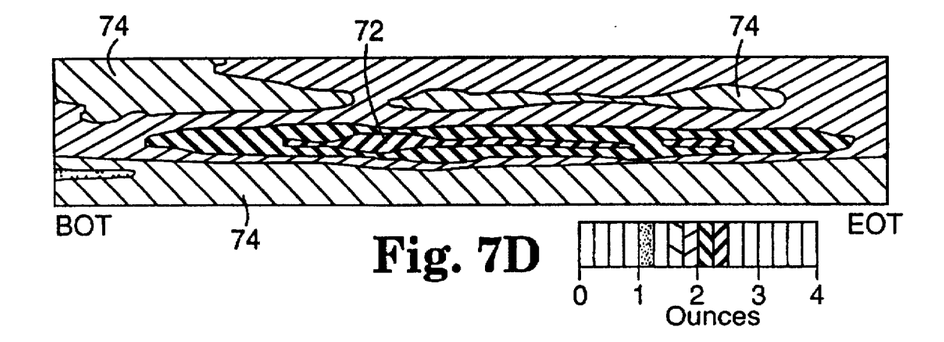

FIGS. 7A and 7B show the localized tape tension profile of Comparative Data Cartridge 1 measured in the forward and the reverse directions, respectively, measured across the width of the tape from the BOT to the EOT. FIGS. 7C and 7D show the localized tape tension profile of Example 1 measured in the forward and the reverse directions, respectively, measured across the width of the tape from the BOT to the EOT. The localized transverse tape tension was measured at 3.05 meters/second (120 inches per second) after 5000 passes.

Example 1 showed more spatially homogeneous tape tension throughout the full length and width of the tape than Comparative Data Cartridge 1. Tape tension along portions 70 is slightly more than about 0.56 Newtons (2 ounces). Tape tension along the remainder of the graph is slightly less than 0.56 Newtons (2 ounces). Isolated portions 71 have a tape tension in the range of about 0.28 Newtons (1 ounce).

The portions 72 correspond to a tape tension of slightly more than about 0.56N (2 ounces). The portions 74 correspond to a tape tension of about 0.28 Newtons (1 ounce). Deformation of the tape pack in Comparative Data Cartridge 1 presumably accounts for the non-uniform tape tension shown in FIGS. 7A and 7B, especially along the center regions 70.

Table 1 below sets forth the cross-web tape tension variation after 5000 passes at the beginning, middle and end of the tape, measured in both the forward and reverse direction for Example 1, Comparative Cartridge 1 and Comparative Cartridge 2.

TABLE 1

| Direction | Location | Example 1 — Variation | Comparative Data Cartridge 1 — Variation | Comparative Data Cartridge 2 — Variation |
|---|---|---|---|---|
| Forward | BOT | 0.30 N (1.1 oz) | 0.18 N (0.63 oz) | 0.38 N (1.35 oz) |
| Forward | MOT | 0.22 N (0.8 oz) | 0.27 N (0.98 oz) | 0.42 N (1.5 oz) |
| Forward | EOT | 0.22 N (0.8 oz) | 0.32 N (1.15 oz) | 0.42 N (1.5 oz) |
|  | Average | 0.25 N (0.9 oz) | 0.26 N (0.92 oz) | 0.41 N (1.45 oz) |
| Reverse | BOT | 0.14 N (0.5 oz) | 0.19 N (0.68 oz) | 0.47 N (1.7 oz) |
| Reverse | MOT | 0.20 N (0.7 oz) | 0.27 N (0.98 oz) | 0.39 N (1.4 oz) |
| Reverse | EOT | 0.14 N (0.5 oz) | 0.20 N (0.72 oz) | 0.31 N (1.1 oz) |

TABLE 1-continued

| Direction | Location | Example 1 — Variation | Comparative Data Cartridge 1 — Variation | Comparative Data Cartridge 2 — Variation |
|---|---|---|---|---|
|  | Average | 0.16 N (0.57 oz) | 0.22 N (0.79 oz) | 0.39 N (1.4 oz) |

The Comparative Data Cartridge 2 showed the greatest cross-web tension variation. In the forward direction, the inventive cartridge of Example 1 showed an average improvement in cross-web tension of 3.8% over the Comparative Cartridge 1 and 39% over the Comparative Cartridge 2. In the reverse direction, the inventive cartridge of Example 1 showed an average improvement in cross-web tension of 27.3% over the Comparative Cartridge 1 and 59% over the Comparative Cartridge 2.

EXAMPLE 2

FIGS. 8A–8F show tape pack deformation profiles across the width of the tape measured at 9.2 meters (30 feet) from the beginning of the tape (BOT). Tape pack deformation was measured as a value of peak-to-valley in a cross-tape direction using a Taylor-Hobson Stylus Profilemeter available from Taylor-Hobson Corporation of Leicester, England.

Figure 8A:
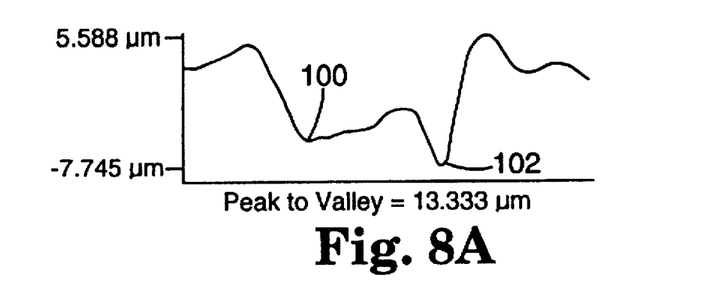
FIGS. 8A–8C are graphs of tape pack deformation for a tape cartridge without a pack belt.
Figure 8B:
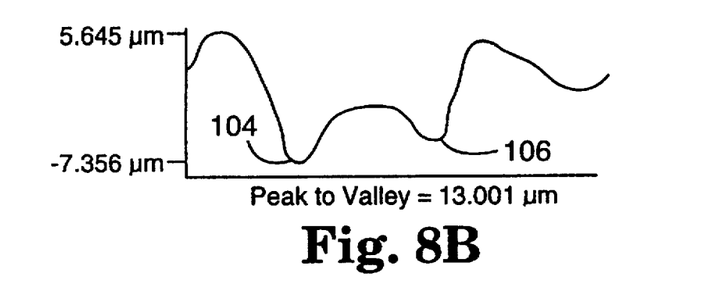

FIGS. 8A and 8B illustrate the initial tape pack deformation profiles of Comparative Data Cartridge 2 and Example 1, respectively, prior to cycling. FIG. 8A shows a peak-to-valley deformation of 13.3 micrometers for Comparative Data Cartridge 2. The two low depressions 100, 102 correspond to the edges of the drive belt. The depression 102 corresponds to the edge of the inside diameter of the belt and the depression 100 corresponds to the edge of the former outside diameter. FIG. 8B shows a peak-to-valley deformation of 13.0 micrometers for Example 1. The depression 104 corresponds to the edge of the outside diameter of the pack belt and the depression 106 corresponds to the edge of the inside diameter of the pack belt.

Figure 8C:
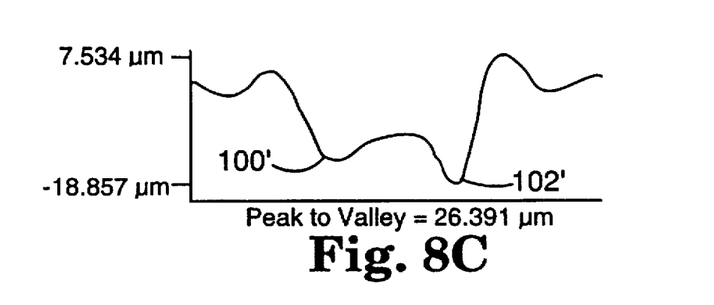
Figure 8D:
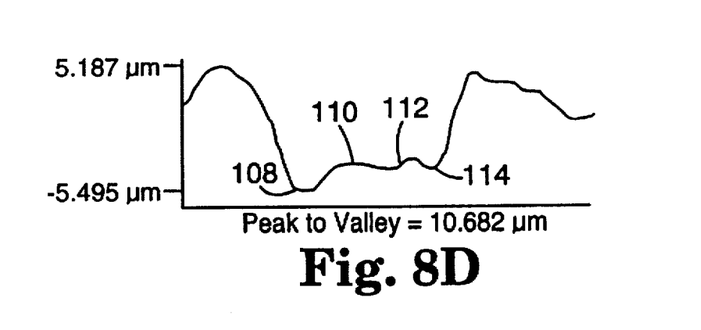
FIGS. 8D–8F are graphs of tape pack deformation for the present tape cartridge with a drive belt narrower than the pack belt.

FIGS. 8C and 8D illustrate the tape pack deformation profiles of Comparative Data Cartridge 2 and Example 1, respectively, after four passes. FIG. 8C shows an increased peak-to-valley deformation of 17.6 micrometers for Comparative Data Cartridge 2. The two depressions 100', 102' correspond to the edges of the drive belt. FIG. 8D shows a peak-to-valley deformation of 10.7 micrometers for Example 1. Cycling the cartridge of Example 1 has distributed the deformation oft he two low depressions 104, 106 of FIG. 8B across four lesser depressions 108, 114 correspond to the edges of the pack belt and 110, 112 corresponding to the edges of the drive belt.

Figure 8E:
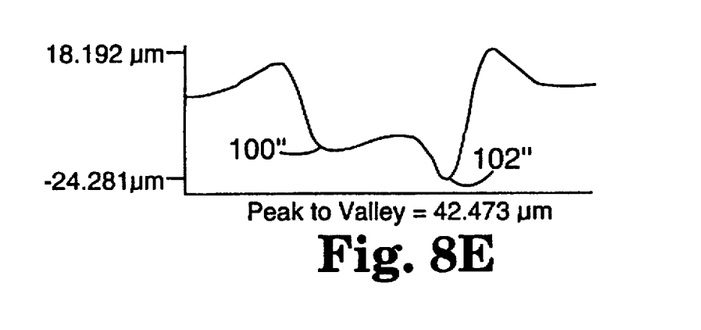
Figure 8F:
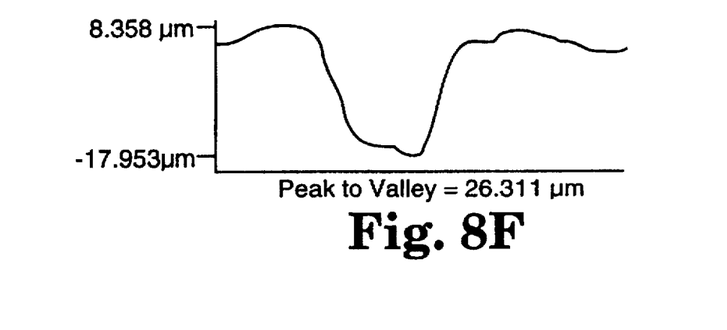

FIGS. 8E and 8F illustrate the tape pack deformation profiles of Comparative Data Cartridge 2 and Example 1, respectively. Comparative Data Cartridge 2 was cycled 9000 passes and Example 1 was cycled 10,500 passes. FIG. 8E shows an increased peak-to-valley deformation of 42.4 micrometers for Comparative Data Cartridge 2. Note that the scale on the vertical axis has changed from FIG. 8C. The two low depressions 100", 102" correspond to the edges of the drive belt. FIG. 8F shows a peak-to-valley deformation of 26.3 micrometers for Example 1. Cycling has blended the four depressions 108, 110, 112, 114 shown in FIG. 8D.

As best illustrated in FIG. 8D, the interfacial region of the tape pack being contacted by a narrow drive belt and a wider pack belt seems to be characterized by four profilemetric features 108, 110, 112, 114 associated with the position of the edges of these belts. The belt pressure gradient along the direction parallel to the axes of the tape packs is considered to be distributed underneath the two belts to provide the reduced tape pack deformation in the Example.

Figure 9:
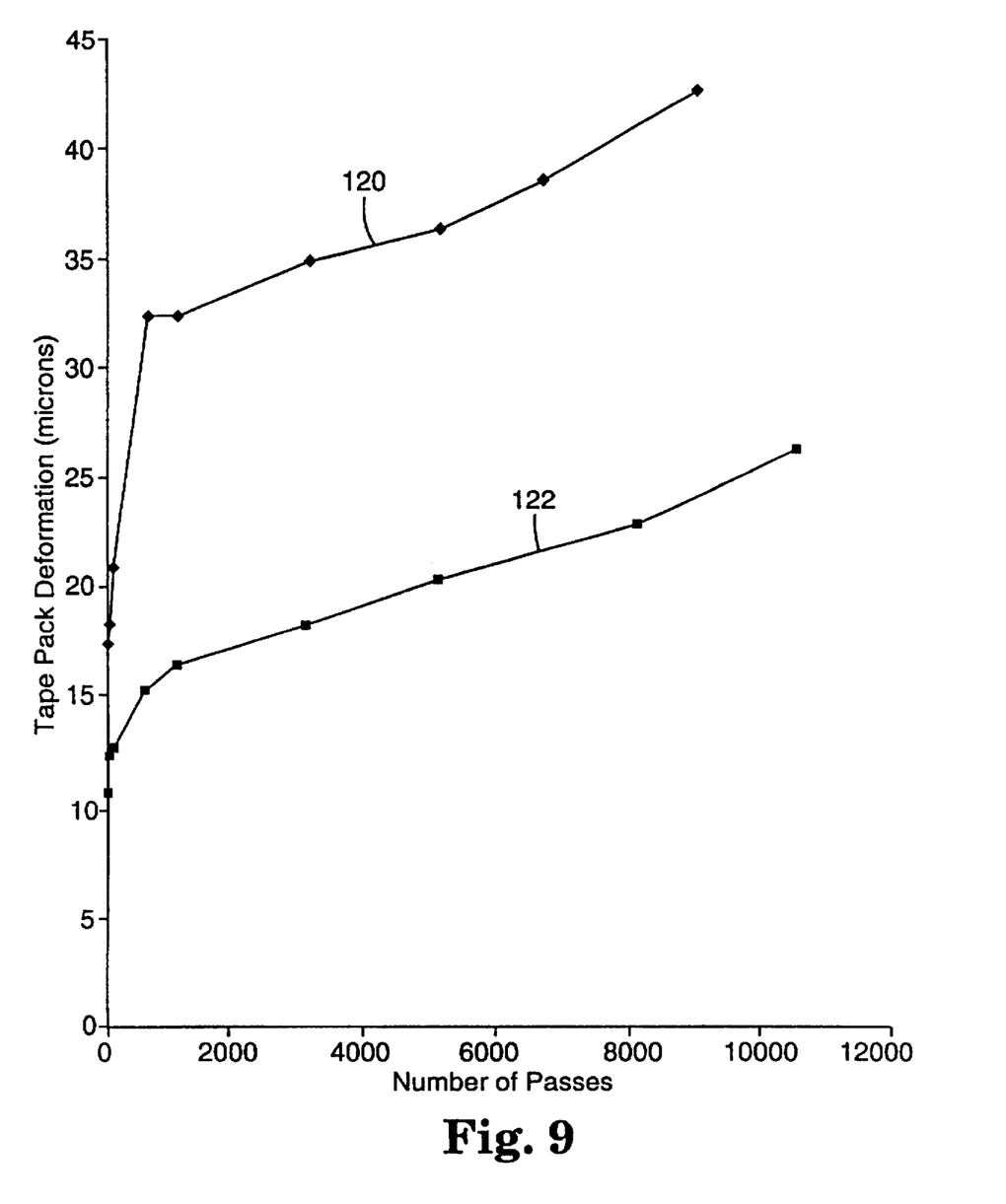
FIG. 9 is a graph showing the change in tape pack deformation as a function of tape cycling.
Figure 10:
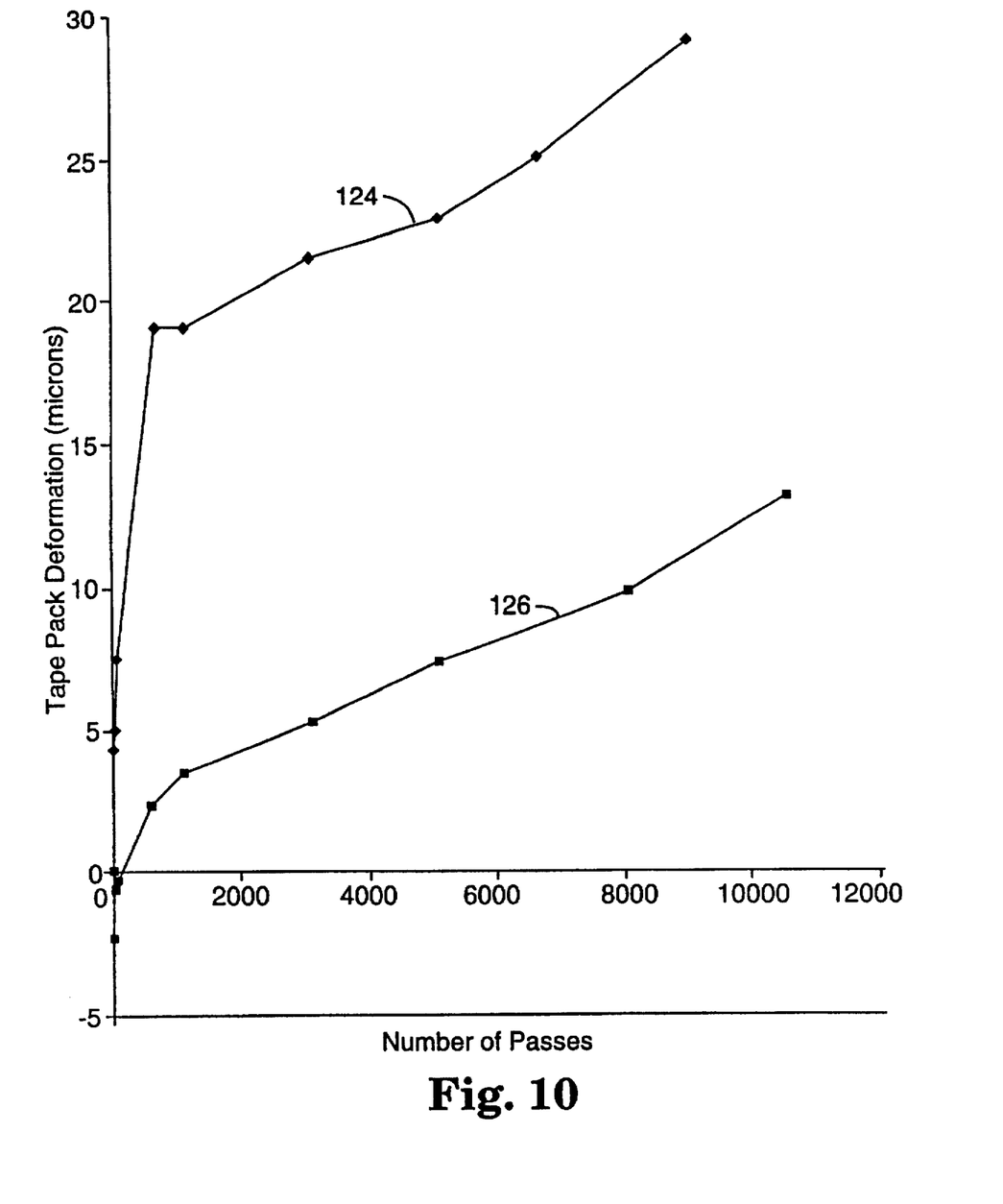
FIG. 10 is a graph showing incremental tape pack deformation as a function of tape cycling.

FIG. 9 illustrates the change in tape pack deformation as a function of the number of passes for Example 1 and the Comparative Data Cartridge 2. Curve 120 corresponds to the Comparative Data Cartridge 2 and curve 122 corresponds to the cartridge of Example 1. FIG. 10 illustrates the change in the incremental tape pack deformation as a function of the number of passes for Example 1 and the Comparative Data Cartridge 2. Curve 124 corresponds to the Comparative Data Cartridge 2 and curve 126 corresponds to the cartridge of Example 1. Comparative Data Cartridge 2 shows a significantly greater increase in tape pack deformation with cycling than the cartridge of Example 1. Additionally, the incremental tape pack deformation of Example 1 was about half of the Comparative Data Cartridge 2 after 10,000 passes.

The invention has been described with respect to particular embodiments, but the scope of the invention is not limited thereto. It will be clear to one of skill in the art that the concepts disclosed above could be combined in various ways, both among the embodiments shown, and with other concepts. Accordingly, the invention is limited only by the scope of the following claims. All patents and patent applications cited herein are hereby incorporated by reference.

What is claimed is:

1. In a belt driven tape cartridge having a supply side tape hub and a winding side tape hub both rotatably mounted on the base, tape wound around the hubs to form a tape pack about each hub, a drive roller rotatably mounted on the base, first and second corner rollers rotatably mounted on the base, a drive belt engaged on the drive roller, the tape pack on the supply side tape hub, the first and second corner rollers, and the tape pack on the winding side tape hub and a pack belt mounted only on the corner rollers and disposed on the inner side of the drive belt, the drive belt comprising a width less than a width of the pack belt to reduce deformation of the tape pack.

2. The apparatus of claim 1 wherein the width of the drive belt comprises about one half the width of the pack belt.

3. The apparatus of claim 1 wherein the pack belt is arranged to start to press the tape pack wound around the winding side tape hub after approximately half of the tape is wound around the winding side tape hub.

4. The apparatus of claim 1 wherein a tension pre-applied to the pick belt is between about 0.55 to 5.56N.

5. The apparatus of claim 1 wherein a tension pre-applied to the drive belt is between about 1.11 and 5.56N.

6. The apparatus of claim 1, wherein the relationship between an outer diameter (r) of the supply side tape hub with no tape wound there around and a maximum outer diameter (R) with the tape wound around and layered on the supply side tape hub comprises $R/r \geq 2.6$.

7. The apparatus of claim 1 wherein the pack belt comprises an elastic material.

8. A belt-driven tape cartridge comprising:

first and second tape hubs rotatably mounted within a drive housing;

tape wound about the first and second hubs to form first and second tape packs thereabout;

a drive roller rotatably mounted in the housing;

first and second corner rollers rotatably mounted in the housing;

a drive belt stretched about the drive roller, the first and second tape packs and the first and second corner rollers such that movement of the drive roller drives movement of the tape; and a pack belt having a width greater than a width of the drive belt and mounted only on the corner rollers for selectively pressing against one or the other of the tape packs to add load to the rotation of that tape pack such that tape pack deformation is reduced.

9. The tape cartridge of claim 8 wherein the width of the drive belt comprises about one half the width of the pack belt.

10. The tape cartridge of claim 8 wherein the tension in the pack belt is pre-applied to be about 30–110% of the tension in the drive belt.

11. The tape cartridge of claim 8 wherein the tension in the pack belt is pre-applied to be about 40–80% of the tension in the drive belt.

12. The tape cartridge of claim 8 wherein the tension in the pack belt is pre-applied to be about 55–65% of the tension in the drive belt.

13. The tape cartridge of claim 8 further comprising wrap pins for guiding the tape and further wherein the tape comprises tape 8 mm wide, the tension in the pack belt is pre-applied to be about 10–50% of the tension in the drive belt.

14. The tape cartridge of claim 8 further comprising wrap pins for guiding the tape and further wherein the tape comprises tape 8 mm wide, the tension in the pack belt is pre-applied to be about 20–40% of the tension in the drive belt.

15. The tape cartridge of claim 8 further comprising wrap pins for guiding the tape and further wherein the tape comprises tape 8 mm wide, the tension in the pack belt is pre-applied to be about 25–35% of the tension in the drive belt.

16. The tape cartridge of claim 8 wherein one side each of the pack belt and the drive belt are coated with an electrically conductive coating, the coated side of the pack belt faces the corner rollers and the coated side of the drive belt faces the uncoated side of the pack belt.

17. The tape cartridge of claim 8 wherein one side each of the pack belt and the drive belt are coated with a coating, the coated side of the pack belt faces the corner rollers and the coated side of the drive belt faces the uncoated side of the pack belt, and wherein the materials of the pack belt and the coating on the drive belt are selected such that the coefficient of friction between them is about 0.1 to 0.4.

18. The tape cartridge of claim 8 wherein the tape is guided along at least a portion of a tape path by self-acting hydrodynamically lubricated guides provided in the cartridge.

* * * * *